United States Patent
Lu (10) Patent No.: US 11,819,908 B2
(45) Date of Patent: Nov. 21, 2023

(54) EXTRUSION MOLDING METHOD AND MOLDING APPARATUS FOR MANUFACTURING SELF-CLINCHING RIVET

(71) Applicant: Penn Engineering & Manufacturing Corp., Danboro, PA (US)

(72) Inventor: Haifeng Lu, Kunshan (CN)

(73) Assignee: Penn Engineering & Manufacturing Corp., Danboro, PA (US)

( * ) Notice: Subject to any disclaimer, the term of this patent is extended or adjusted under 35 U.S.C. 154(b) by 488 days.

(21) Appl. No.: 16/564,157

(22) Filed: Sep. 9, 2019

(65) Prior Publication Data
US 2020/0376539 A1 Dec. 3, 2020

(51) Int. Cl.
*B21K 1/60* (2006.01)
(52) U.S. Cl.
CPC ...................... *B21K 1/60* (2013.01)
(58) Field of Classification Search
CPC ... B21K 1/58; B21K 1/60; F16B 19/04; F16B 19/086; B21J 5/08
See application file for complete search history.

(56) References Cited

U.S. PATENT DOCUMENTS

| | | | | |
|---|---|---|---|---|
| 3,114,921 A | * | 12/1963 | Carusi | B21J 5/08 470/30 |
| 7,175,533 B2 | * | 2/2007 | Franco | B21J 5/027 470/152 |
| 2002/0054806 A1 | * | 5/2002 | Sakamura | B23P 19/062 411/180 |
| 2006/0018709 A1 | * | 1/2006 | Doerr | F16B 19/04 403/408.1 |
| 2009/0116932 A1 | * | 5/2009 | Kihara | B21J 13/025 411/369 |

* cited by examiner

*Primary Examiner* — Kyle A Cook
(74) *Attorney, Agent, or Firm* — Gregory J. Gore, Esq.

(57) ABSTRACT

The present invention discloses a extrusion forming method and a forming apparatus for manufacturing a self-clinching rivet, wherein the forming method comprises: upset-extruding a first end of a wire blank to shape it into a material pushing portion and a shank portion billet, upset-extruding the shank portion billet to shape it into a shank portion and a groove portion, and upset-extruding a second end of the wire blank to create a slot portion and a slot shaft portion. The invention for manufacturing the self-clinching rivet by one-time extrusion forming does not generate waste during processing, which greatly improves a utilization rate of raw materials compared with the traditional machining method. Meanwhile, a formed piece manufactured by the present invention has complete metal streamlines, which can greatly improve its strength compared with the one manufactured by machining and avoid a risk of hydrogen embrittlement in a subsequent surface treatment.

13 Claims, 5 Drawing Sheets

Prior Art

FIG. 1

Prior Art

FIG. 2

Prior Art

Prior Art

EXTRUSION MOLDING METHOD AND MOLDING APPARATUS FOR MANUFACTURING SELF-CLINCHING RIVET

RELATED APPLICATION

This is a non-provisional patent application related to Chinese patent application 201910468707.8 entitled "Extrusion Molding Method and Molding Apparatus for Manufacturing Self-Clinching Rivet" filed on May 31, 2019, priority from which is hereby claimed.

TECHNICAL FIELD

The present invention generally relates to extrusion forming technology, and more particularly, to an extrusion forming method and a forming apparatus for manufacturing a self-clinching I-rivet.

BACKGROUND

Figure 1:
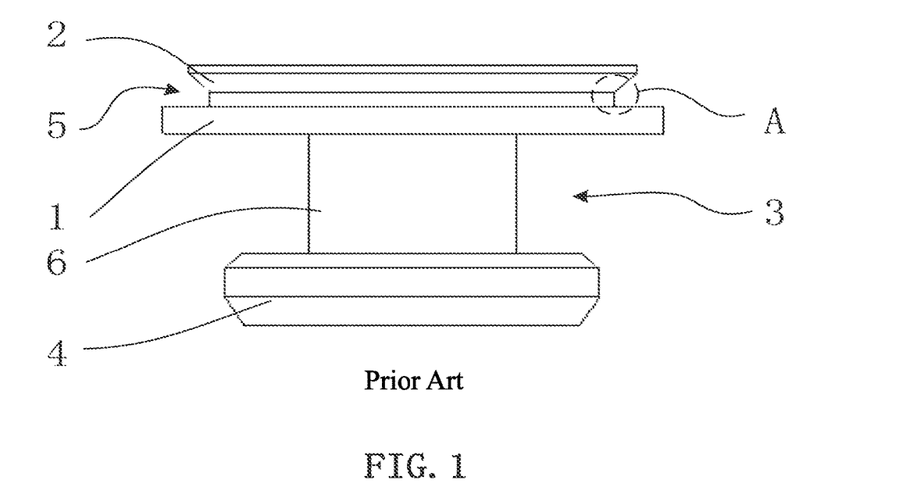
FIG. 1 is a structure diagram of a self-clinching rivet.

A self-clinching I-rivet is a plate joint fastener for use in quick assembly and disassembly of panels. An exemplary rivet structure is illustrated in FIG. 1, which includes a material pushing portion 1, a shank portion 2, a slot portion 3 and a slot shaft portion 4, wherein the material pushing portion 1 and the shank portion 2 have a recessed groove portion 5 therebetween, and the slot portion 3 is enclosed by the material pushing portion 1, the slot shaft portion 4, and a shaft portion 6 connecting the two.

Figure 2:
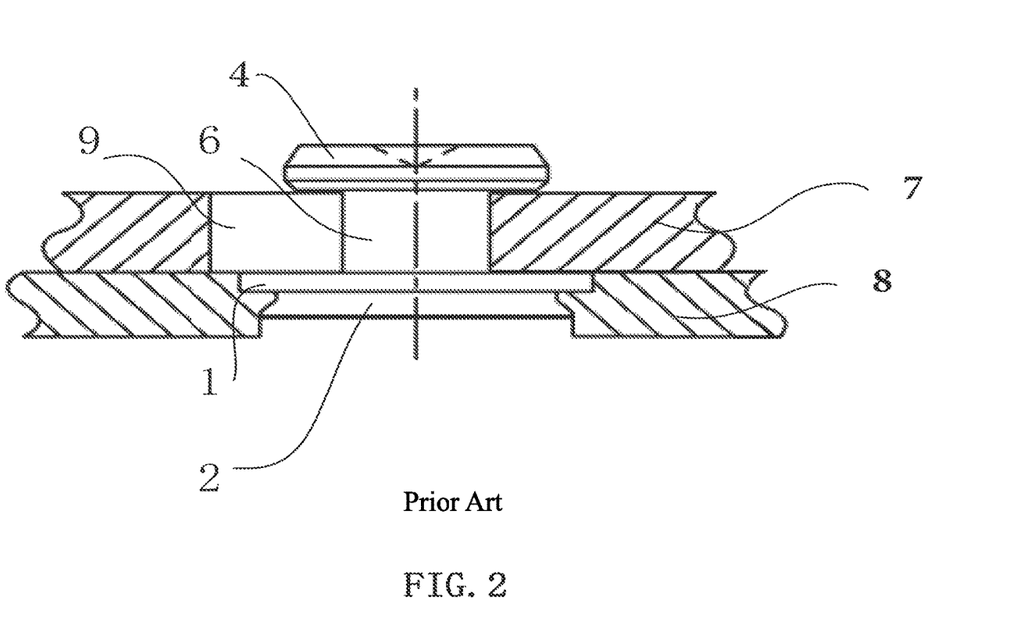
FIG. 2 illustrates a state of use when a self-clinching rivet is used for assembling panels.
Figure 3:
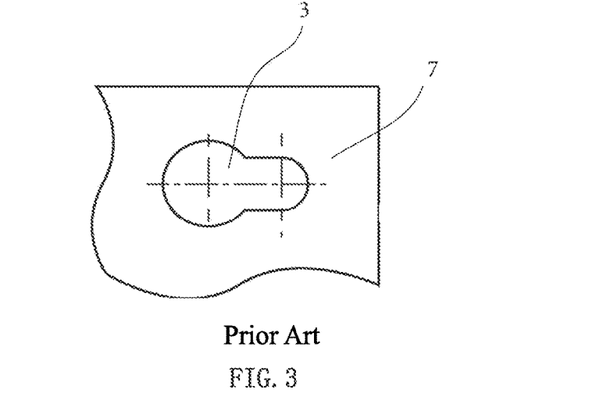
FIG. 3 is a partial structure diagram of the second panel of FIG. 2.

As illustrated in FIG. 2 and FIG. 3, when assembling the panels, the self-clinching I-rivet is firstly inserted into a hole formed on a first panel 7 and applied with pressure which causes the material pushing portion 1 to press against the panel material. Accordingly, a panel material of the first panel 7 is extruded to flow into the groove portion 5, such that the self-clinching I-rivet is riveted into the first panel 7. Then, a second panel 8 is engaged with the slot portion 3 by sliding the rivet within a fastening hole 9 on the second panel 8 from a section having a larger aperture to another section having a smaller aperture, thereby achieving quick assembly of the two panels. When disassembly is required, the second panel 8 can be detached from the first panel 7 simply by sliding the second panel 8 laterally.

Since the I-rivet of such type is small in size, its shank portion 2 is of a tapered shape and its slot portion 3 and groove portion 5 have inwardly recessed structures, it is difficult to manufacture such I-rivets using extrusion forming process, and the I-rivets of that type are conventionally manufactured using machining process. However, this machining process is inefficient and wastes raw materials. Moreover, fibers of the rivets manufactured using the machining process may be cut off, affecting the strength thereof.

SUMMARY

In order to overcome the defects in the prior art, the embodiments of the present invention provide an extrusion forming method and a forming apparatus for manufacturing a self-clinching I-rivet, which have an advantage of fast processing and manufacturing of the self-clinching I-rivets.

An embodiment of the present application discloses an method for manufacturing a self-clinching rivet, comprising the following steps:

upset-extruding a first end of a wire blank to shape the first end into a material pushing portion and an annular shank portion billet, wherein the shank portion billet extends axially along the wire blank, and wherein the shank portion is located at a lower side of the material pushing portion, and a lower side surface of the shank portion billet has a downwardly divergent tapered portion with a cross-sectional area gradually decreasing from top to bottom; or the shank portion billet located at an upper side of the material pushing portion, and the upper side surface of the shank portion billet has an upwardly divergent tapered portion with a cross-sectional area gradually increasing from top to bottom;

upset-extruding the shank portion billet, such that the tapered portion flows in a direction away from the wire blank, thereby forming a shank portion extending in the radial direction of the wire blank and a groove portion between the shank portion and the material pushing portion, wherein the shank portion has a cross-sectional area gradually increases from its first end adjacent to the material pushing portion to its second end away from the material pushing portion;

upset-extruding a second end of the wire blank to shape the second end into a slot shaft portion, thereby forming a slot portion by the slot shaft portion, the wire blank formed between the first end and the second end, and the material pushing portion or the shank portion, wherein the second end of the wire blank is disposed opposite to the first end of the wire blank.

Further, before the step of "upset-extruding the first end of the wire blank", the method further comprises: providing the wire blank, wherein a volume of the wire blank is equal to a volume of the self-clinching rivet manufactured by the method.

Further, between the step of "providing the wire blank" and the step of "upset-extruding the first end of the wire blank", the method further comprises: upset-extruding the wire blank to shape the first end of the wire blank into a head billet that facilitates forming of the material pushing portion and the shank portion billet by the first extrusion mechanism.

Further, in the step of "providing the wire blank", a wire is clip by a clipping mechanism to obtain the wire blank.

Further, the step of "upset-extruding the shank portion billet" comprises: forming a round transition between the shank portion and the material pushing portion.

Further, the step of "upset-extruding the second end of the wire blank" comprises: forming the slot shaft portion by open-close segment dies forming.

Figure 10:
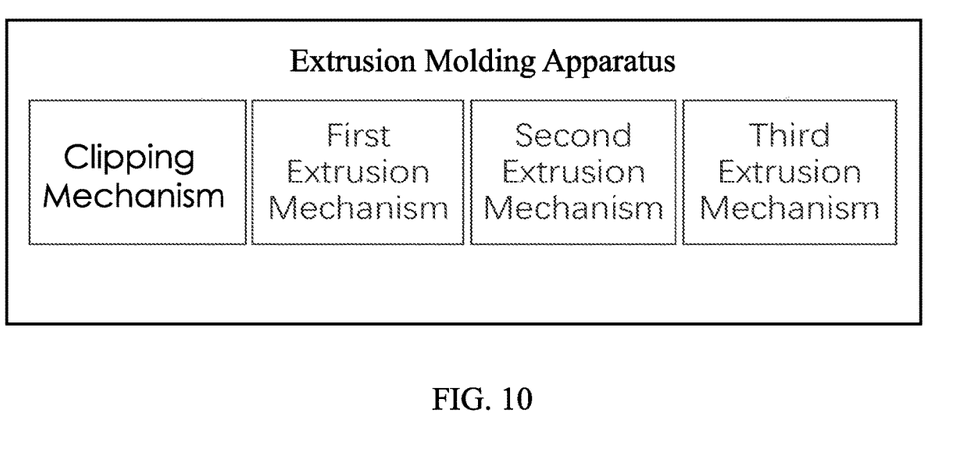
FIG. 10 is a diagram showing components of the extrusion molding apparatus including the clipping mechanism and the first, second and third extrusion mechanisms.

The embodiments of the present application also disclose an extrusion forming apparatus for manufacturing a self-clinching rivet as illustrated in FIG. 10, which comprises:

a first extrusion mechanism for upset-extruding a first end of the wire blank to form the first end into a material pushing portion and an annular shank portion billet, wherein the shank portion billet extends axially along the wire blank, and wherein the shank portion is located at a lower side of the material pushing portion, a lower side surface of the shank portion billet having a downwardly divergent tapered portion with a cross-sectional area gradually decreasing from top to bottom; or wherein the shank portion billet is located on an upper side of the material pushing portion, and an upper side surface of the shank portion billet having an upwardly divergent tapered portion with a cross-sectional area gradually increasing from top to bottom;

a second extrusion mechanism for upset-extruding the shank portion billet, such that the tapered portion flows in a direction away from the wire blank, thereby forming a shank portion extending in the radial direction of the wire blank and a groove portion between the shank portion and the material pushing portion, wherein the shank portion has a cross-sectional area gradually increases from its first end adjacent to the material pushing portion to its second end away from the material pushing portion;

a third extrusion mechanism for upset-extruding a second end of the wire blank to form the second end of the wire blank into a slot shaft portion, thereby forming a slot portion by the slot shaft portion, the wire blank formed between the first end and the second end, and the material pushing portion or the shank portion, wherein the second end of the wire blank is disposed opposite to the first end of the wire blank;

Further, the extrusion forming apparatus further comprises a clipping mechanism for clipping a wire to obtain the wire blank.

Further, the extrusion forming apparatus further comprises a fourth extrusion mechanism configured to upset-extrude the wire blank obtained through clipping by the clipping mechanism to shape the first end of the wire blank into a head billet that facilitates forming of the material pushing portion and the shank portion billet by the first extrusion mechanism.

Further, the fourth extrusion mechanism, the first extrusion mechanism, the second extrusion mechanism, and the third extrusion mechanism of the extrusion forming apparatus process the wire blank sequentially.

The beneficial effects of the present invention are as follows:

1. The extrusion forming method and the forming apparatus for manufacturing self-clinching rivets provided in the present invention manufacture the self-clinching rivet using one-time extrusion processing without waste generation during processing. Compared with the conventional machining method, the present method significantly increases the utilization rate of raw materials, which means that material waste is reduced, energy consumption is reduced and processing cost is saved.

2. The size of the formed self-clinching rivet manufactured by the extrusion forming method and the forming apparatus for manufacturing self-clinching rivet provided in the present invention is determined and guaranteed by the dies structure, thereby making the dimensions of the formed self-clinching rivet more consistent.

3. The formed self-clinching rivet manufactured by the present invention have complete and continuous metal streamline, which can significantly improve the strength compared with the formed self-clinching rivet produced by machining process, and the risk of hydrogen embrittlement in the subsequent surface treatment can be avoided.

In order to make the foregoing and other purposes, features and advantages of the present invention more clearly understandable, a number of preferred embodiments are provided below together with the accompanying drawings to provide a detailed description as follows:

BRIEF DESCRIPTION OF THE DRAWINGS

In order to more clearly illustrate the embodiments of the present invention or the technical solutions in the prior art, the drawings used in the embodiments or the description of the prior art will be briefly described below. Obviously, the drawings in the following description are only some embodiments of the present invention, and a person skilled in the art can obtain other drawings based on the following drawings without any creative work.

The reference numbers for the accompanying drawings above are: 1, material pushing portion; 2, shank portion; 3, slot portion; 4, slot shaft portion; 5, groove portion; 6, shaft portion; 7, first panel 8, second panel; 9, fastening hole; 10, rounded groove transition; 11, wire blank; 20, head billet; 30, shank portion billet; 40, tapered portion.

DETAILED DESCRIPTION OF THE PREFERRED EMBODIMENTS

The technical solutions in the embodiments of the present invention are clearly and completely described as follows with reference to the accompanying drawings in the embodiments of the present invention. It is obvious that the described embodiments are only a part of the embodiments of the present invention, rather than all the embodiments. Any other embodiment obtained by a person skilled in the art based on the embodiments of the present invention without creative work is within the protection scope of the present invention.

A first objective of the present invention is to provide a method for manufacturing a self-clinching rivet through extrusion forming to replace conventional manufacturing methods using machining technology, so as to improve an efficiency of manufacturing the self-clinching rivet.

Specifically, the method may include the following steps:

First, a first end of a wire blank 10 is upset-extruded to obtain a head billet 20. In this step, the head billet 20 may be upset-extruded into a shape as shown in a second state (from left to right, i.e. a first deformation state) in FIG. 4 or FIG. 6, or other prepared shapes that can facilitate subsequent upset-extrusion forming to form a material pushing portion 1 and a shank portion 2.

Before this step, the wire blank 10 can also be provided by clipping a wire using a clipping mechanism. Of course, in other alternative embodiments, the wire blank 10 can also be provided by other mechanisms that can divide the wire evenly into a plurality of wire blanks 10 suitable for extrusion processing. Preferably, a volume of the wire blank 10 is equal to a volume of the self-clinching rivet to be manufactured.

Then, the head billet 20 is upset-extruded to shape it into a material pushing portion 1 and an annular shank portion billet 30. As illustrated a third state (from left to right, i.e. a second deformation state) in FIGS. 6 and 7, the shank portion billet 30 extends axially along the wire blank 10 and is located at a lower side of the material pushing portion 1. A lower side surface of the shank portion billet 30 has a downwardly divergent tapered portion 40 with a cross-sectional area gradually decreasing from top to bottom. In another alternative embodiment, as shown in the third state (from left to right, i.e. the second deformation state) in FIGS. 4 and 5, the shank portion billet 30 may be located on an upper side of the material pushing portion 1, and an upper side surface of the shank portion billet 30 has an upwardly divergent tapered portion 40 being a cylinder with a conical central cavity with a cross-sectional area gradually increasing from top to bottom.

By upset-extruding the head billet 20, a side of the material pushing portion 1 is shaped into a flat head plane, and the shank portion billet 30 is formed at the other side of the material pushing portion 1. Preferably, in order to obtain the shank portion 2 with a desired size (e.g. a section of the formed shank portion 2 cutting in the axial direction of the rivet is shaped as an isosceles trapezoid), in the next step, it is desired that an end of the tapered portion 40 obtained by filling a die cavity with a part of the head billet 20 during the upset-extrusion processing should be a full sharp corner.

Subsequently, the shank portion billet 30 is upset-extruded such that the tapered portion 40 flows in a direction away from the wire blank 10, thereby forming the shank portion 2 extending in a radial direction of the wire blank 10, and a groove portion 5 between the shank portion 2 and the material pushing portion 1. The shank portion 2 has a cross-sectional area gradually increasing from its first end adjacent to the material pushing portion 1 to its second end away from the material pushing portion 1.

Figure 4:
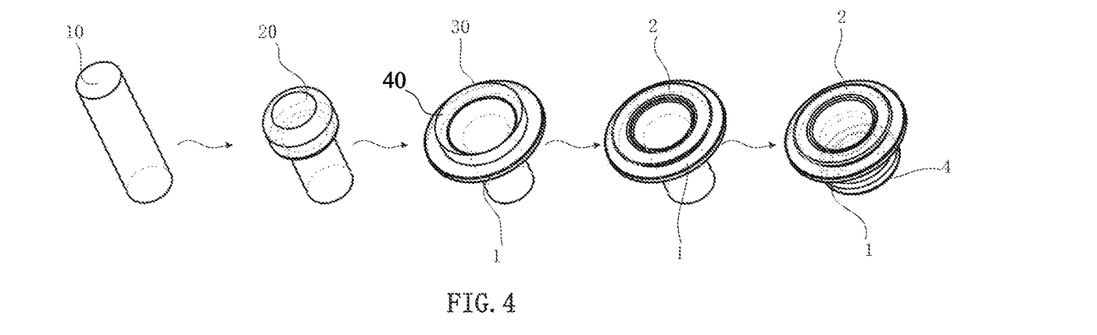
FIG. 4 is a perspective view illustrating extruding deformation of a self-clinching rivet in Example 1 according to the embodiments of the present invention.
Figure 6:
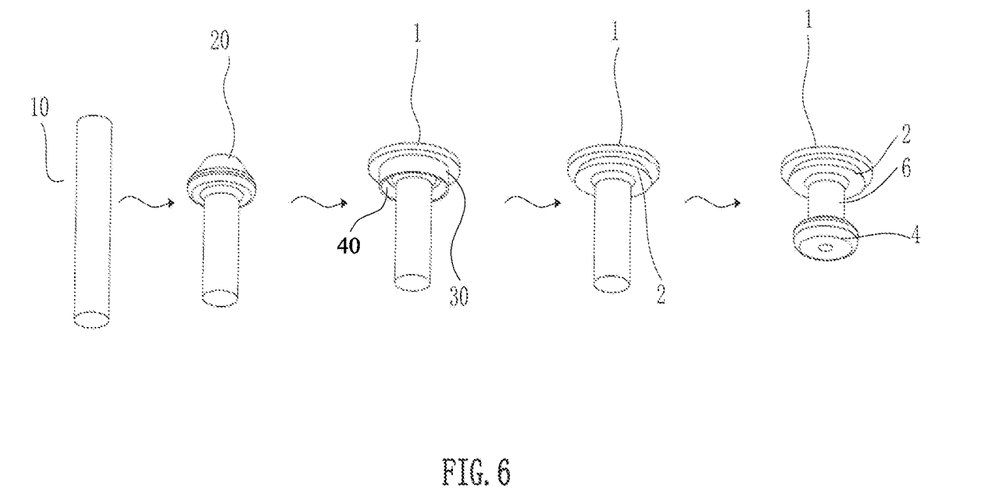
FIG. 6 is a perspective view illustrating the extruding deformation of a self-clinching rivet in Example 2 according to the embodiments of the present invention.

In this step, referring to a fourth state (from left to right, i.e. a third deformation state) in FIG. 4 or FIG. 6, a height and a diameter of the shank portion billet 30 are controlled by the die cavity to conform to a height and a diameter of the shank portion 2, such that the material of the tapered portion 40 formed in the aforementioned step can be deformed and flow in the direction away from the wire blank 10, and the shank portion billet 30 is deformed into the shank portion 2. Specifically, since the cross-sectional area of the tapered portion 40 changes in the axial direction of the wire blank 10, when it is upset-extruded in a direction from its first end having a smaller cross-sectional area to its second end having a larger cross-sectional area (i.e., in a direction from an end of the tapered portion 40 which away from the material pushing portion 1 to another end of the tapered portion 40 which is adjacent to the material pushing portion 1), the groove portion 5 and the shank portion 2 are formed due to the differences in material height and material flow rate in the tapered portion 40 under the forming by the die cavity.

Finally, a second end of the wire blank is upset-extruded to shape the second end of the wire blank into a slot shaft portion 4. As such, a slot portion 3 can be formed by the slot shaft portion 4, the wire blank 10 formed between the first end and the second end, and the material pushing portion 1 or the shank portion 2. The second end of the wire blank 10 is opposite to the first end of the wire blank 10.

In this step, referring to a fifth state (from left to right, i.e. a fourth deformation state) in FIG. 4 or FIG. 6, a second end opposite to the first end of the wire blank 10, where the material pushing portion 1 and the shank portion 2 are formed, is shaped into the slot shaft portion 4. Accordingly, the slot portion 3 is formed between the slot shaft portion 4 having a diameter larger than that of the wire blank 10 and the material pushing portion 1 or the shank portion 2. Specifically, the slot shaft portion 4 is formed by an open-close segment die (also referred to as a half die) so as to facilitate ejection of the slot portion 3 after forming.

A second objective of the present invention is to provide an extrusion forming apparatus for manufacturing a self-clinching rivet.

The apparatus includes a first extrusion mechanism for upset-extruding the head billet 20 to shape it into a material pushing portion 1 and an annular shank portion billet 30. The shank portion billet 30 extends axially along the wire blank 10 and is located at a lower side of the material pushing portion 1. A lower side surface of the shank portion billet 30 has a downwardly divergent tapered portion 40 with a cross-sectional area gradually decreasing from top to bottom. Alternatively, the shank portion billet 30 is located on an upper side of the material pushing portion 1, and an upper side surface of the shank portion billet has an upwardly divergent tapered portion 40 with a cross-sectional area gradually increasing from top to bottom.

The apparatus further includes a second extrusion mechanism for upset-extruding the shank portion billet 30, such that the tapered portion 40 flows in a direction away from the wire blank 10, thereby forming a shank portion 2 extending in a radial direction of the wire blank 10 and a groove portion 5 between the shank portion 2 and the material pushing portion 1. The shank portion 2 has a cross-sectional area which gradually increases from its first end adjacent to the material pushing portion 1 to its second end away from the material pushing portion 1.

The apparatus further includes a third extrusion mechanism for upset-extruding the second end of the wire blank 10 to form the second end of the wire blank 10 into a slot shaft portion 4, thereby forming a slot portion 3 by the slot shaft portion 4, the wire blank 10 formed between the first end and the second end, and the material pushing portion 1 or the shank portion 2. The second end of the wire blank 10 is disposed opposite to the first end of the wire blank 10.

Preferably, the extrusion forming apparatus further includes a clipping mechanism for clipping the wire to obtain the wire blank, and the third extrusion mechanism comprises an open-close segment die for forming the slot shaft portion 4.

Preferably, the extrusion forming apparatus further includes a fourth extrusion mechanism configured to upset-extrude the wire blank 10 clipped by the clipping mechanism, so as to shape the first end of the wire blank 10 into the head billet 20 that facilitates forming of the material pushing portion 1 and the shank portion billet 30 by the first extrusion mechanism. Specifically, the fourth extrusion mechanism, the first extrusion mechanism, the second extrusion mechanism, and the third extrusion mechanism of the extrusion forming apparatus process the wire blank sequentially.

It should be noted that the extrusion forming process of the present invention may be performed in a cold upset, warm upset or hot upset manner, and accordingly, the extrusion forming apparatus may be a cold upset apparatus, a warm upset apparatus, or a hot upset apparatus.

FIG. 10 is a schematic representations of an extrusion forming apparatus for manufacturing a self-clinching rivet according to the embodiments of the present invention. As shown in FIG. 10 the extrusion forming apparatus may include a first extrusion mechanism, a second extrusion mechanism, a third extrusion mechanism and a fourth extrusion mechanism. The apparatus is controlled to perform respective extruding steps described with reference to the other embodiments of the present application. Two specific examples are described in detail below.

Example 1

Figure 5:
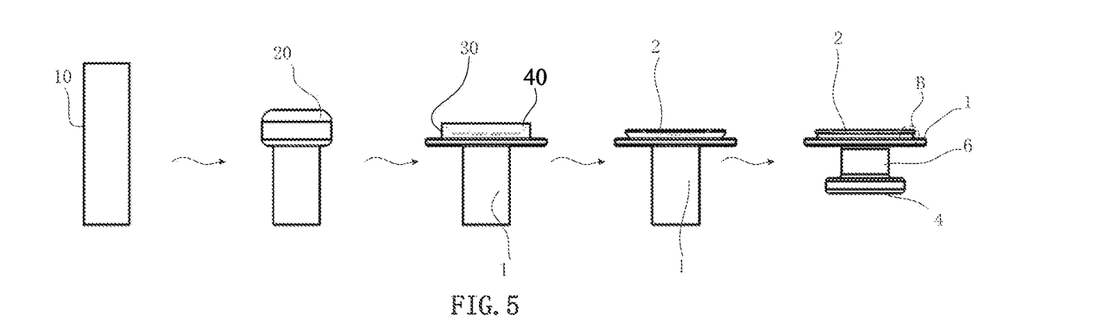
FIG. 5 is a front view illustrating the extruding deformation of a self-clinching rivet in Example 1 according to the embodiments of the present invention.

Referring to FIG. 4 and FIG. 5, different states of a wire blank 10 are illustrated from left to right, including a first state of the wire blank 10, a second state of the wire blank 10 after processing by a fourth extrusion mechanism, a third state of the wire blank 10 after processing by a first extrusion mechanism, a fourth state of the wire blank 10 after processing by a second extrusion mechanism, and a fifth state of the wire blank 10 (the formed piece) after processing by a third extrusion mechanism.

A clipping mechanism can be used to clip a wire to obtain the wire blank 10 having a volume equal to that of the self-clinching rivet to be manufactured.

The wire blank 10 is transported by a clamp to the fourth extrusion mechanism which upset-extrudes a first end of the wire blank 10 into the head billet 20.

The wire blank 10 processed by the fourth extrusion mechanism is transported to the first extrusion mechanism by the clamp, so as to upset-extrude the head billet 20 into a material pushing portion 1 and an annular shank portion billet 30. The shank portion billet 30 extends in an axial direction of the wire blank 10 and is located at a lower side of the material pushing portion 1. A lower side surface of the shank portion billet 30 has a downwardly divergent tapered portion 40, which has a cross-sectional area gradually decreasing from top to bottom.

The wire blank 10 processed by the first extrusion mechanism is then transported by a clamp to a second extrusion mechanism which upset-extrudes the shank portion billet 30, such that the tapered portion 40 flows in a direction away from the wire blank 10, thereby forming a shank portion 2 extending in a radial direction of the wire blank 10 and a groove portion 5 between the shank portion 2 and the material pushing portion 1. The shank portion 2 has a cross-sectional area gradually increasing from its first end adjacent to the material pushing portion 1 to its second end away from the material pushing portion 1.

The wire blank 10 processed by the second extrusion mechanism is transported by a clamp to a third extrusion mechanism which upset-extrudes the second end of the wire blank 10, such that the second end of the wire blank 10 is shaped into a slot shaft portion 4. As such, a slot portion 3 is formed by the slot shaft portion 4, the wire blank 10 formed between the first end and the second end, and the material pushing portion 1 or the shank portion 2. Then the third extrusion mechanism ejects the formed self-clinching rivet. The second end of the wire blank 10 is disposed opposite to the first end of the wire blank 10.

Example 2

Figure 7:
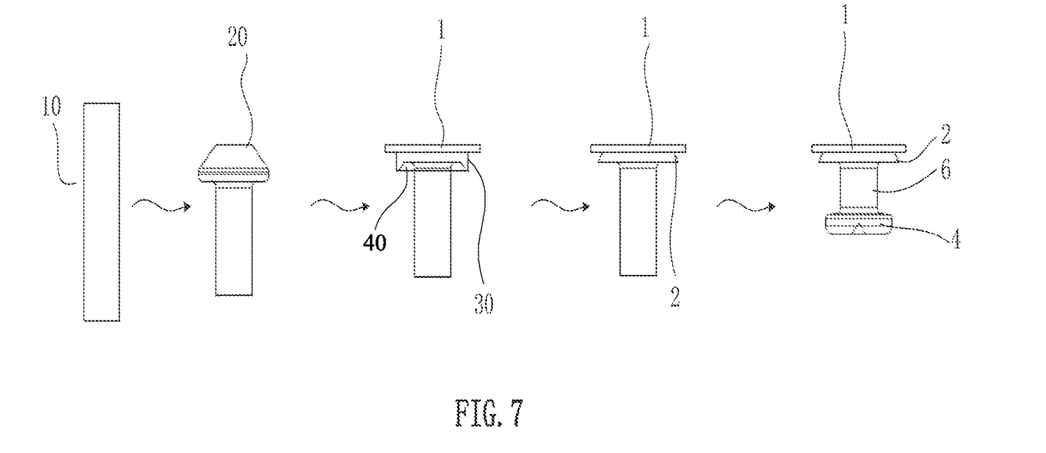
FIG. 7 is a front view illustrating the extruding deformation of a self-clinching rivet in Example 2 according to the embodiments of the present invention.

Referring to FIG. 6 and FIG. 7, different states of a wire blank 10 are illustrated from left to right, including a first state of the wire blank 10, a second state of the wire blank 10 after processing by a fourth extrusion mechanism, a third state of the wire blank 10 after processing by a first extrusion mechanism, a fourth state of the wire blank 10 after processing by a second extrusion mechanism, and a fifth state of the wire blank 10 after processing by a third extrusion mechanism.

A clipping mechanism can be used to clip a wire to obtain the wire blank 10 having a volume equal to that of the self-clinching rivet to be manufactured.

The wire blank 10 is transported by a clamp to the fourth extrusion mechanism which upset-extrudes a first end of the wire blank 10 into a head billet 20.

The wire blank 10 processed by the fourth extrusion mechanism is transported to the first extrusion mechanism by the clamp, so as to upset-extrude the head billet 20 into a material pushing portion 1 and an annular shank portion billet 30. The shank portion billet 30 extends in an axial direction of the wire blank 10 and is located on an upper side of the material pushing portion 1. An upper side surface of the shank portion billet 30 has an upwardly divergent tapered portion 40, which has a cross-sectional area gradually increasing from top to bottom.

The wire blank 10 processed by the first extrusion mechanism is transported by a clamp to the second extrusion mechanism which upset-extrudes the shank portion billet 30, such that the tapered portion 40 flows in a direction away from the wire blank 10, thereby forming a shank portion 2 extending in a radial direction of the wire blank 10 and a groove portion 5 between the shank portion 2 and the material pushing portion. The shank portion 2 has a cross-sectional area gradually increasing from its first end adjacent to the material pushing portion 1 to its second end away from the material pushing portion 1.

The wire blank 10 processed by the second extrusion mechanism is transported by a clamp to the third extrusion mechanism. The third extrusion mechanism is an open-close segment die for upset-extruding the second end of the wire blank 10, such that the second end of the wire blank 10 is shaped into a slot shaft portion 4. As such, a slot portion 3 is formed by the slot shaft portion 4, the wire blank 10 formed between the first end and the second end, and the material pushing portion 1 or the shank portion 2. Then the third extrusion mechanism ejects the formed self-clinching rivet. The second end of the wire blank 10 is disposed opposite to the first end of the wire blank 10.

The present invention has at least the following advantages with the above extrusion forming method and forming apparatus:

1. Through multiple extrusion mechanisms, a self-clinching rivet can be manufactured by a compact process. Compared with the conventional machining method, the present method significantly increases the utilization rate of raw materials, which means that material waste is reduced, energy consumption is reduced and processing cost is saved.

2. The size of the self-clinching rivet manufactured by the extrusion forming method and the forming apparatus for manufacturing self-clinching rivet provided in the present invention is determined and guaranteed by the die structure, thereby making the dimensions of the self-clinching rivets more consistent.

3. The formed pieces of the rivets manufactured by the method of the present invention can be manufactured by direct extrusion, which have complete and continuous metal streamlines, thereby improving the strength of the rivets.

4. Compared with the self-clinching rivet manufactured by the machining method, the extrusion forming method can significantly reduce the residual stress of the pieces and avoid the risk of hydrogen embrittlement in the subsequent surface treatment.

Figure 8:
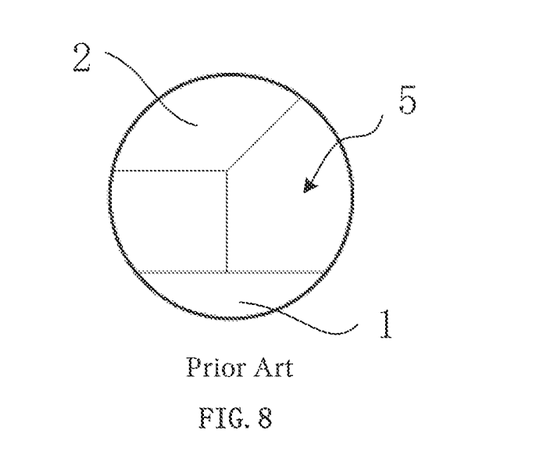
FIG. 8 is an enlarged structure diagram of portion A in FIG. 1.
Figure 9:
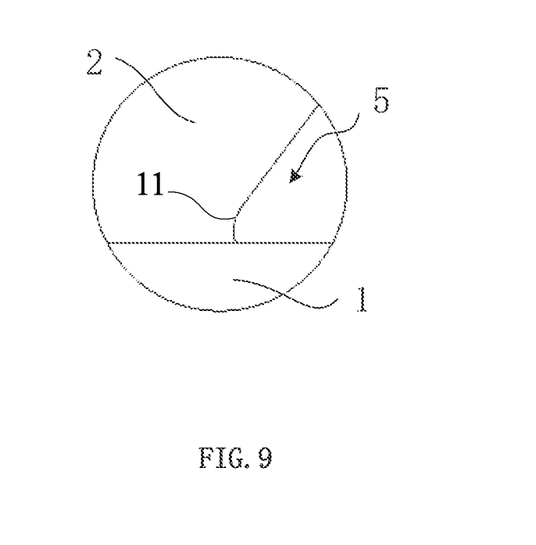
FIG. 9 is an enlarged structure diagram of portion B in FIG. 5 showing the rounded groove transition.

5. In the step of upset-extruding the shank portion billet 30 of the above extrusion forming method, when forming the shank portion 2 and the material pushing portion 1, a groove portion 5 having a fillet radius at its bottom can be formed between the shank portion 2 and the material pushing portion 1, that is, a continuous round transition 11 as seen in FIG. 9 is formed between the shank portion 2 and the material pushing portion 1. However, if the groove portion 5 is formed using the machining method, a straight transition section will be formed at the deepest part of the groove portion 5 between the shank portion 2 and the material pushing portion 1 (see FIG. 8). Therefore, compared with the machining method for manufacturing a self-clinching rivet of the same specification, a streamlined continuous groove portion 5 can be formed through the extrusion manufacturing method provided by the present invention. Therefore, when assembling panels using the rivets, a stronger receiving space can be formed for a panel material of the panels which may flow into the receiving space, thereby creating a more stable installation structure.

The principles and embodiments of the present invention have been described in accompanying the specific embodiments of the present invention. The description of the above embodiments is only for facilitating the understanding of the method of the present invention and the core concept thereof. Meanwhile, for a person skilled in the art, in accordance with the idea of the present invention, there will be changes in specific embodiments and applications. In all, the content of the specification shall not be construed as limiting the scope of the present invention.

What is claimed is:

1. An extrusion forming apparatus for manufacturing a self-clinching rivet, the extrusion forming apparatus comprising:
    a first extrusion mechanism for upset-extruding a billet formed at a first end of a wire blank to shape the billet into a material pushing portion and forming an annular shank portion billet, wherein the annular shank portion billet extends axially from the material pushing portion along the wire blank, and
        wherein the annular shank portion billet has a conical central cavity and a tapered portion with a cross-sectional area gradually decreasing from the material pushing portion to an end thereof;
    a second extrusion mechanism for upset-extruding and having a mold to further shape the annular shank portion billet, such that the tapered portion flows in a direction away from the wire blank, thereby forming a shank portion extending in a radial direction of the wire blank and a groove portion between the shank portion and the material pushing portion, wherein the shank portion has a cross-sectional area which gradually increases from its first end adjacent to the material pushing portion to its second end away from the material pushing portion;
    a third extrusion mechanism for upset-extruding with a mold a second end of the wire blank opposite the first end to shape the second end of the wire blank into a slot shaft portion, thereby forming a slot portion located between the slot shaft portion and the material pushing portion.

2. The extrusion forming apparatus of claim 1 wherein the annular shank portion billet is located at an upper side of the material pushing portion.

3. The extrusion forming apparatus of claim 1 wherein the groove has a round transition between the shank portion and the material pushing portion.

4. The extrusion forming apparatus of claim 1 wherein the material pushing portion defines an end of the rivet.

5. The extrusion forming apparatus of claim 1, further comprising
    a fourth extrusion mechanism configured to upset-extrude the wire blank to shape the first end of the wire blank into the billet that facilitates forming of the material pushing portion and the shank portion billet by the first extrusion mechanism.

6. The extrusion forming apparatus of claim 5, wherein the fourth extrusion mechanism, the first extrusion mechanism, the second extrusion mechanism, and the third extrusion mechanism of the extrusion forming apparatus process the wire blank sequentially.

7. The extrusion forming apparatus of claim 1 wherein the annular shank portion billet is located at a lower side of the material pushing portion.

8. The extrusion forming apparatus of claim 7 wherein the slot portion extends between the shank portion and the slot shaft portion.

9. The extrusion forming apparatus of claim 1 wherein the annular shank portion billet is a cylinder with the conical central cavity.

10. The extrusion forming apparatus of claim 9 wherein the axial cross-section of the annular shank portion billet cavity is an isosceles trapezoid.

11. The extrusion forming apparatus of claim 9 wherein the annular shank portion billet has a flat base and a tapered side.

12. A method of processing a billet at the end of a wire blank utilizing the extrusion forming apparatus of claim 1, comprising the steps of:
    providing a billet at the end of a wire blank; and
    extruding the billet in a series of extrusion process steps using the first, second and third extrusion mechanisms in accordance with claim 7 in a sequence of first, second and third steps respectively.

13. The method of claim 12 wherein the billet is extruded by the first extrusion mechanism to produce a cylindrical shank portion billet with a conical central cavity.

* * * * *